(12) United States Patent
Sangameshwara et al.

(10) Patent No.: US 11,012,826 B2
(45) Date of Patent: *May 18, 2021

(54) METHOD AND APPARATUS FOR TRANSMITTING A MISSION CRITICAL DATA MESSAGE IN A COMMUNICATION SYSTEM

(71) Applicant: Samsung Electronics Co., Ltd., Gyeonggi-do (KR)

(72) Inventors: Vijay Sangameshwara, Bangalore (IN); Nishant Gupta, Sitapur (IN); Sapan Pramodkumar Shah, Bangalore (IN); Siva Prasad Gundur, Bangalore (IN); Basavaraj Jayawant Pattan, Bangalore (IN); Suresh Chitturi, Bangalore (IN); Bhargav Madishetty, Karimnagar (IN)

(73) Assignee: Samsung Electronics Co., Ltd

( * ) Notice: Subject to any disclaimer, the term of this patent is extended or adjusted under 35 U.S.C. 154(b) by 0 days.

This patent is subject to a terminal disclaimer.

(21) Appl. No.: 16/800,686

(22) Filed: Feb. 25, 2020

(65) Prior Publication Data

US 2020/0196114 A1    Jun. 18, 2020

Related U.S. Application Data

(62) Division of application No. 16/339,518, filed as application No. PCT/KR2017/011073 on Sep. 29, 2017.

(30) Foreign Application Priority Data

Oct. 4, 2016  (IN) .................. 201641033941 PS
Sep. 28, 2017  (IN) .................. 201641033941 CS

(51) Int. Cl.
  *H04M 1/725*   (2021.01)
  *H04W 4/14*    (2009.01)
  *H04W 28/04*   (2009.01)

(52) U.S. Cl.
  CPC ............. *H04W 4/14* (2013.01); *H04W 28/04* (2013.01)

(58) Field of Classification Search
  None
  See application file for complete search history.

(56) References Cited

U.S. PATENT DOCUMENTS

2003/0069988 A1    4/2003 Rune et al.
2007/0217763 A1    9/2007 Siemens et al.
(Continued)

FOREIGN PATENT DOCUMENTS

WO    WO 2006/094087    9/2006
WO    WO 2016/006908    1/2016

OTHER PUBLICATIONS

Salkintzis_WO2006-094087A2.pdf (Year: 2006).*
(Continued)

*Primary Examiner* — Jinsong Hu
*Assistant Examiner* — Alexander J Yi
(74) *Attorney, Agent, or Firm* — The Farrell Law Firm, P.C.

(57) ABSTRACT

A method and an apparatus are provided for transmitting a mission critical data (MCData) notification message by a first user equipment (UE) in a communication system by generating an MCData notification message to share disposition information and transmitting the MCData notification message to a second UE. The MCData notification message includes at least one of a notification message identity information element to identify a type of the MCData notification message, a date and time information element to (Continued)

indicate a time when the MCData notification message was sent, a conversation identifier (ID) information element to identify a conversation, and a message ID information element to identify the MCData message within the conversation.

8 Claims, 15 Drawing Sheets

(56) References Cited

U.S. PATENT DOCUMENTS

| | | | | |
|---|---|---|---|---|
| 2010/0216434 | A1* | 8/2010 | Marcellino | H04W 36/385 |
| | | | | 455/412.2 |
| 2011/0282953 | A1* | 11/2011 | Lee | H04L 51/16 |
| | | | | 709/206 |
| 2012/0117268 | A1 | 5/2012 | Shaffer et al. | |
| 2013/0110919 | A1 | 5/2013 | An | |
| 2015/0195178 | A1 | 7/2015 | Bhattacharya et al. | |
| 2015/0289116 | A1 | 10/2015 | Lei et al. | |
| 2017/0238154 | A1* | 8/2017 | Vagelos | H04W 4/90 |
| | | | | 455/466 |
| 2018/0131730 | A1 | 5/2018 | Leis | |

OTHER PUBLICATIONS

Rfc5438_pub. date—Feb. 2009.pdf (Year: 2009).*
U.S. Office Action dated Mar. 9, 2020 isseud in counterpart U.S. Appl. No. 16/339,518, 27 pages.
U.S. Office Action dated Sep. 8, 2020 isseud in counterpart U.S. Appl. No. 16/339,518, 31 pages.
PCT/ISA/210 Search Report issued on PCT/KR2017/011073, pp. 3.
PCT/ISA/237 Written Opinion issued on PCT/KR2017/011073, pp. 7.
Samsung, 3GPP TSG CT WG1 Meeting #103 C1-171417, Spokane (WA), USA, Apr. 3, 2017, Proposal for MCData protocol, pp. 7.
Motorola Solutions, Air Wave, 3GPP TSG CT WG1 Meeting #101bis C1-170156, Spokane (WS), USA, Jan. 16, 2017, Media plane protocol for MCData, pp. 2.
3GPP TS 24.282 V14.0.1 Jun. 16, 2017, 3rd Generation Partnership Project; Technical Specification Group Core Networks and Terminals; Mission Critical Data (MCData) signalling control; Protocol specification (Release 14), pp. 192.
Samsung, 3GPP TSG-CT WG1 Meeting #103 C1-171728, Spokane (WS), USA, Jan. 16, 2017, Pseudo-CR on MCData message functional definitions and contents, pp. 4.
Samsung Electronics, 3GPP TSG-CT WG1 Meeting #103 C1-171740, Spokane (WA), USA, Apr. 3, 2017, Pseudo-CR on Off-network SDS messages and protocols, pp. 3.
Samsung, 3GPP TSG-CT WG1 Meeting #103 C1-171814, Spokane (WS), USA, Jan. 16-20, 2017, Pseudo-CR on general message format and information elements coding for the MCData protocol, pp. 7.
Samsung Electronics Co, Ltd., Provisional Specification, 2005, MCData message and notification format, pp. 19.

* cited by examiner

SDS Signalling Payload Message Format

| 8 | 7 | 6 | 5 | 4 | 3 | 2 | 1 | Bits | |
|---|---|---|---|---|---|---|---|---|---|
| colspan="8" | Message Type {1 Byte} | | | | | | | | Octet - 1 |
| colspan="8" | Date and Time {5 Bytes} | | | | | | | | Octet - 2 ⋮ Octet - 6 |
| colspan="8" | Conversation ID {16 Bytes} | | | | | | | | Octet - 7 ⋮ Octet - 22 |
| colspan="8" | Message ID {16 Bytes} | | | | | | | | Octet - 23 ⋮ Octet - 38 |
| 0 | 0 | 1 | 0 | 0 | 0 | 0 | 1 | Octet - 39 |
| colspan="8" | InReply To Message ID {16 Bytes} | | | | | | | | Octet - 40 ⋮ Octet - 55 |
| 0 | 0 | 1 | 0 | 0 | 0 | 1 | 0 | Octet - 56 |
| colspan="8" | Application ID {1 Bytes} | | | | | | | | Octet - 57 |
| 1 | 0 | 0 | 0 | colspan="4" | SDS Disposition Request Type {4 Bits} | | | | Octet - 58 |

SDS Notification Message Format

| 8 | 7 | 6 | 5 | 4 | 3 | 2 | 1 | Bits | |
|---|---|---|---|---|---|---|---|---|---|
| colspan="8" | Message Type {1 Byte} | | | | | | | | Octet - 1 |
| colspan="8" | SDS Disposition Notification Type {1 Bytes} | | | | | | | | Octet - 2 |
| colspan="8" | Date and Time {5 Bytes} | | | | | | | | Octet - 3 ⋮ Octet - 7 |
| colspan="8" | Conversation ID {16 Bytes} | | | | | | | | Octet - 8 ⋮ Octet - 23 |
| colspan="8" | Message ID {16 Bytes} | | | | | | | | Octet - 24 ⋮ Octet - 39 |
| 0 | 0 | 1 | 0 | 0 | 0 | 1 | 0 | Octet - 40 |
| colspan="8" | Application ID {1 Bytes} | | | | | | | | Octet - 41 |

Data Payload Message Format

| 8 | 7 | 6 | 5 | 4 | 3 | 2 | 1 | Bits | |
|---|---|---|---|---|---|---|---|---|---|
| colspan="8" | Message Type {1 Byte} | | | | | | | | Octet - 1 |
| colspan="8" | Number of Payloads {1 Byte} | | | | | | | | Octet - 2 |
| 0 | 1 | 1 | 1 | 1 | 0 | 0 | 0 | Octet - 3 |
| colspan="8" | Payloads Length {2 Bytes} | | | | | | | | Octet - 4,5 |
| colspan="8" | Payload - 1 | | | | | | | | Octet - 6 ⋮ Octet - 6+Length-1 |
| colspan="8" | Payload - N | | | | | | | | Octet - n ⋮ Octet - n+Length-1 |

FIG.2A

MCData message format

FD Signalling Payload Message Format

| 8 | 7 | 6 | 5 | 4 | 3 | 2 | 1 | Bits |
|---|---|---|---|---|---|---|---|---|
| \multicolumn{8}{c|}{Message Type (1 Byte)} | Octet - 1 |
| \multicolumn{8}{c|}{Date and Time (5 Bytes)} | Octet - 2 ⋮ Octet - 6 |
| \multicolumn{8}{c|}{Conversation ID (16 Bytes)} | Octet - 7 ⋮ Octet - 22 |
| \multicolumn{8}{c|}{Message ID (16 Bytes)} | Octet - 23 ⋮ Octet - 38 |
| 0 | 0 | 1 | 0 | 0 | 0 | 0 | 1 | Octet - 39 |
| \multicolumn{8}{c|}{InReply To Message ID (16 Bytes)} | Octet - 40 ⋮ Octet - 55 |
| 0 | 0 | 1 | 0 | 0 | 0 | 1 | 0 | Octet - 56 |
| \multicolumn{8}{c|}{Application ID (1 Bytes)} | Octet - 57 |
| 1 | 0 | 0 | 1 | \multicolumn{4}{c|}{FD Disposition Request Type (4 Bits)} | Octet - 58 |
| 1 | 0 | 1 | 0 | \multicolumn{4}{c|}{Mandatory download (4 Bits)} | Octet - 59 |
| 0 | 1 | 1 | 1 | 1 | 0 | 0 | 0 | Octet - 60 |
| \multicolumn{8}{c|}{Payloads Length (2 Bytes)} | Octet - 61,62 |
| \multicolumn{8}{c|}{Payload (Length Bytes)} | Octet - 63 ⋮ Octet - 63+Length-1(x) |
| 0 | 1 | 1 | 1 | 1 | 0 | 0 | 1 | Octet - x+1 |
| \multicolumn{8}{c|}{Metadata Length (2 Bytes)} | Octet - x+2,x+3 |
| \multicolumn{8}{c|}{Metadata (Length Bytes)} | Octet - x+4 ⋮ Octet - x+Length+3 |

MCData notification message format

FD Notification Message Format

| 8 | 7 | 6 | 5 | 4 | 3 | 2 | 1 | Bits |
|---|---|---|---|---|---|---|---|---|
| \multicolumn{8}{c|}{Message Type (1 Byte)} | Octet - 1 |
| \multicolumn{8}{c|}{FD Disposition Notification Type (1 Bytes)} | Octet - 2 |
| \multicolumn{8}{c|}{Date and Time (5 Bytes)} | Octet - 3 ⋮ Octet - 7 |
| \multicolumn{8}{c|}{Conversation ID (16 Bytes)} | Octet - 8 ⋮ Octet - 23 |
| \multicolumn{8}{c|}{Message ID (16 Bytes)} | Octet - 24 ⋮ Octet - 39 |
| 0 | 0 | 1 | 0 | 0 | 0 | 1 | 0 | Octet - 40 |
| \multicolumn{8}{c|}{Application ID (1 Bytes)} | Octet - 41 |

FIG.2B

|   8 |   7 |   6 |   5 |   4 |   3 |   2 |   1 |         |
|-----|-----|-----|-----|-----|-----|-----|-----|---------|
| MSB | x   | x   | x   | x   | x   | x   | x   | octet 1 |
| x   | x   | x   | x   | x   | x   | x   | x   |         |
| x   | x   | x   | x   | x   | x   | x   | LSB | octet N |

FIG.3

| 8 | 7 | 6 | 5 | 4 | 3 | 2 | 1 | |
|---|---|---|---|---|---|---|---|---|
| Message type | | | | | | | | octet 1 |
| Other information elements as required | | | | | | | | octet 2 ... octet n |

FIG.4

| 8 | 7 | 6 | 5 | 4 | 3 | 2 | 1 | Bits |
|---|---|---|---|---|---|---|---|------|
| Message type (1 Byte) | | | | | | | | octet - 1 |

FIG.5

| 8 | 7 | 6 | 5 | 4 | 3 | 2 | 1 | Bits |
|---|---|---|---|---|---|---|---|------|
| 1 | 0 | 0 | 0 | SDS Disposition Request Type (4 Bits) | | | | octet - 1 |

FIG.6

| 8 | 7 | 6 | 5 | 4 | 3 | 2 | 1 | Bits |
|---|---|---|---|---|---|---|---|------|
| Number of Payloads (1 Byte) ||||||||  octet - 1 |

FIG.15

| 8 | 7 | 6 | 5 | 4 | 3 | 2 | 1 | Bits |
|---|---|---|---|---|---|---|---|------|
| 0 | 1 | 1 | 1 | 1 | 0 | 0 | 0 | octet - 1 |
| Payload Length (2 Bytes) |||||||| octet - 2,3 |
| Payload Content* |||||||| octet - 4 |
|  |||||||| octet - 4+Length-1 |

FIG.16

| 8 | 7 | 6 | 5 | 4 | 3 | 2 | 1 | Bits |
|---|---|---|---|---|---|---|---|------|
| Payload Content Type (1 Byte) |||||||| octet - 1 |
| Payload Data |||||||| octet - 2 |
|  |||||||| octet - 2+Length-1 |

FIG.17

| 8 | 7 | 6 | 5 | 4 | 3 | 2 | 1 | Bits |
|---|---|---|---|---|---|---|---|------|
| 1 | 0 | 1 | 0 | Mandatory Download (4 Bits) |||| octet - 1 |

FIG.18

| 8 | 7 | 6 | 5 | 4 | 3 | 2 | 1 | Bits |
|---|---|---|---|---|---|---|---|---|
| 0 | 1 | 1 | 1 | 1 | 0 | 0 | 0 | octet - 1 |
| Metadata Length(2 Bytes) | | | | | | | | octet - 2,3 |
| Metadata | | | | | | | | octet - 4 |
| | | | | | | | | octet - 4+Length-1 |

FIG.19

| 8 | 7 | 6 | 5 | 4 | 3 | 2 | 1 | Bits |
|---|---|---|---|---|---|---|---|---|
| 0 | 0 | 1 | 0 | 0 | 1 | 0 | 0 | octet - 1 |
| MCData user ID Length (2 Bytes) | | | | | | | | octet - 2,3 |
| MCData user ID | | | | | | | | octet - 4 |
| | | | | | | | | octet - 4+Length+1 |

FIG.20

| 8 | 7 | 6 | 5 | 4 | 3 | 2 | 1 | Bits |
|---|---|---|---|---|---|---|---|---|
| 0 | 0 | 1 | 0 | 0 | 0 | 1 | 1 | octet - 1 |
| MCData group ID Length (2 Bytes) | | | | | | | | octet - 2,3 |
| MCData group ID | | | | | | | | octet - 4 |
| | | | | | | | | octet - 4+Length-1 |

FIG.21

METHOD AND APPARATUS FOR TRANSMITTING A MISSION CRITICAL DATA MESSAGE IN A COMMUNICATION SYSTEM

PRIORITY

This application is Divisional application of U.S. patent application Ser. No. 16/339,518, which was filed with the U.S. Patent and Trademark Office on Apr. 4, 2019 as a National Phase Entry of PCT International Application No. PCT/KR2017/011073, which was filed on Sep. 29, 2017, and claims priority to Indian Patent Application No. 201641033941 (CS), which was filed in the Indian Intellectual Property Office on Sep. 28, 2017, and Indian Patent Application No. 201641033941 (PS), which was filed in the Indian Intellectual Property Office on Oct. 4, 2016, the entire disclosure of each of these applications is incorporated herein by reference.

BACKGROUND

1. Field

The present disclosure relates to a mission critical data (MCData) service, and more particularly to a method and an apparatus for transmitting a MCData message in a communication system.

2. Description of the Related Art

Mission critical services, in particular (MCData) communication, provide a set of services and procedures to mission critical users to allow reliable, predictable, secure and flexible data communications. The MCData communication makes frequent use of a set of capabilities and enablers that allows for many end user services to be built on a common foundation. A short data service (SDS) feature of a MCData service could be considered as a basic protocol carrying a limited size, but variable content and a payload message. The payload message could be a text message or could be marked for extensible purposes including short binary messages for an application communication. Messaging in the MCData service could be one-to-one messaging or could be group messaging using groups as specified in a MCCoRe. Below are some key requirements from a MCData message capability which needs to be considered while defining solution.

a) Policy assertion capabilities,
   b) Identifying applications,
   c) Different notifications—like read receipt, reject and delivery,
   d) Delivery history interrogation,
   e) Multiple message capability in single payload, and
   f) Conversation management.

SUMMARY

There are existing methods available which can handle some of the above requirements, but they have limitations with respect to a type of notifications and also with respect to handling of multiple payloads in a single message. Also, the existing methods use more data with a header name and a value pair, which in turn restricts actual user data size carried in the single message. Further, the existing methods do not support multiple types of payload in the single message.

Thus, it is desired to address the above mentioned disadvantages or other shortcomings or at least provide a useful alternative. An aspect of the embodiments herein is to provide a method for encoding and decoding MCData messages in a MCData communication system.

Accordingly to an aspect of present disclosure, a method is provided for transmitting a mission critical data (MCData) notification message by a first user equipment (UE) in a communication system, with the method comprising: generating an MCData notification message to share disposition information; and transmitting the MCData notification message to a second UE, wherein the MCData notification message comprises at least one of a notification message identity information element to identify a type of the MCData notification message, a date and time information element to indicate a time when the MCData notification message was sent, a conversation identifier (ID) information element to identify a conversation, and a message ID information element to identify the MCData message within the conversation.

Accordingly to another aspect of present disclosure, a first user equipment (UE) is provided in a communication system, the first UE comprising a transceiver and at least one processor, which is configured to generate a mission critical data (MCData) notification message to share disposition information and control the transceiver to transmit the MCData notification message to a second UE, wherein the MCData notification message comprises at least one of a notification message identity information element to identify a type of the MCData notification message, a date and time information element to indicate a time when the MCData notification message was sent, a conversation identifier (ID) information element to identify a conversation, and a message ID information element to identify the MCData message within the conversation.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

This method is illustrated in the accompanying drawings, throughout which like reference letters indicate corresponding parts in the various figures. The embodiments herein will be better understood from the following description with reference to the drawings, in which:

FIGS. 2a-2b illustrates a MCData message including a signalling content related to multiple MCData payloads and a MCData notification message including a signalling content related to multiple MCData payloads, according to an embodiment as disclosed herein;

FIG. 3 is an example illustration of bit ordering of a field related to the MCData message, according to an embodiment as disclosed herein;

FIG. 4 is an example illustration of a general MCData message organization, according to an embodiment as disclosed herein;

FIG. 5 is an example illustration of an message type information element, according to an embodiment as disclosed herein;

FIG. 6 is an example illustration of a SDS disposition request type information element, according to an embodiment as disclosed herein;

FIG. 15 is an example illustration of a number of payloads information element, according to an embodiment as disclosed herein;

FIG. 16 is an example illustration of a payload information element, according to an embodiment as disclosed herein;

FIG. 17 is an example illustration of a payload content field of payload information element, according to an embodiment as disclosed herein;

FIG. 18 is an example illustration of a mandatory download information element value, according to an embodiment as disclosed herein;

FIG. 19 is an example illustration of a metadata information element, according to an embodiment as disclosed herein;

FIG. 20 is an example illustration of a MCData user ID information element, according to an embodiment as disclosed herein;

FIG. 21 is an example illustration of a MCData group ID information element, according to an embodiment as disclosed herein;

DETAILED DESCRIPTION

Figure 1:
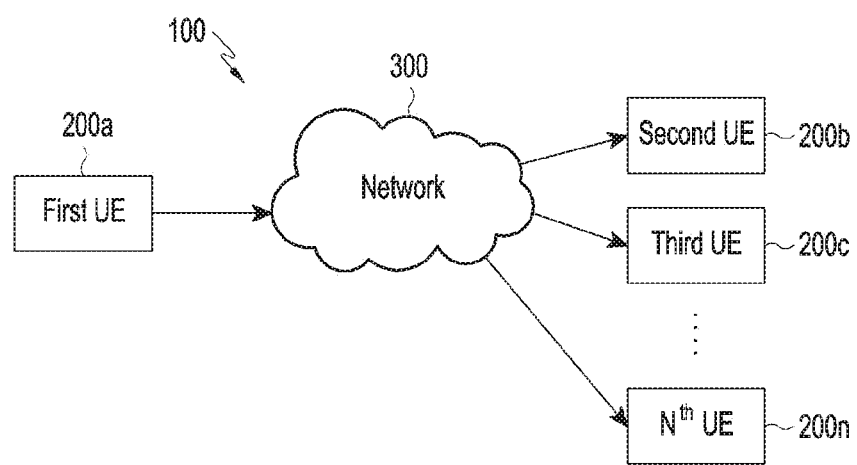
FIG. 1 illustrates an overview of a MCData communication system, according to an embodiment as disclosed herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as managers, units, modules, hardware components or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

Accordingly embodiments herein disclose a method for encoding and decoding MCData messages in a MCData communication system. The method includes generating, by a first UE, a MCData message including a signalling content related to multiple MCData payloads. Further, the method includes communicating the MCData message to a second UE.

The proposed method can be used to generate a message format (i.e., MCData message format and MCData notification format) that represents an actual user message that is carried as payload, in the SDS service and the FD Service in the MCData communication system. The proposed method can be used to encode a user data shared as part of the MCData SDS service and the FD service in an effective manner. The method can used to send multiple messages (e.g., text, location, binary or the like) in the single MCData message.

Unlike conventional methods and the systems, the MCData message format and the MCData notification message format are designed in the form of TLV to eliminate a protocol header overhead and a key-value pair overhead, since in the MCData service there is stringent restriction of message size to be at least 1000 bytes or characters. The proposed method can be used to reduce the bandwidth consumption. The proposed method can be used to support for a variable content type.

The MCData message format and the MCData notification message format allow multiple user messages of heterogeneous content types in a single payload. The MCData message format and the MCData notification message format ensure that an encoding procedure does not add much overhead in terms of additional data, which allows a message size up to 1000 bytes to be sent on a signalling plane. This ensures shorter turn-around-time as time is not wasted while establishing a media plane. The MCData message format and the MCData notification message format are designed in the form TLV so that it does not need any explicit parser/composer, unlike XML or CPIM which require pre-processing, so that the proposed method can be used to reduce a signal processing time.

The proposed method can be used to provide a data-efficient payload format that allows easy encoding and decoding, essentially used by the MCData SDS and the MCData FD service. The data-efficient payload format enables carrying maximum data in an optimum space, delivered in-time (i.e., stringent KPI requirements) for mission critical services. The data-efficient payload format assures inter-working and inter-operability, crucial for mission critical networks which constitute of various heterogeneous systems working coherently. The method can used to send multiple messages (e.g., text, location, binary or the like) in the single MCData notification message.

The proposed method is associated with the 3GPP TS 24.282 v14.0.1 that is related to a MCData signalling control specification. The proposed method is also associated with the 3GPP TS 24.582 v14.0.0 that is related to a MCData media plane control specification.

Referring now to the drawings, and more particularly to FIGS. 1 through 29 there are shown preferred embodiments.

FIG. 1 illustrates an overview of a MCData communication system 100, according to an embodiment as disclosed herein. The MCData communication system 100 includes a set of UEs 200a-200n and a network 300. The UEs 200a-200n can be, for example, but not limited to a smart phone, a laptop, a personal digital assistance (PDA) or the like.

In an embodiment, UE 200a is configured to generate a MCData message including a signalling content related to multiple MCData payloads. After generating the MCData message including the signalling content, the UE 200a is configured communicate to the MCData message to another UEs 200b-200n.

In an embodiment, the signaling content includes a signalling payload message identity information element, a date and time information element, a conversation identifier information element, a message identifier information element, an In-Reply-to message identifier information element, an application identifier information element, a disposition type information element, and a number of payloads information element.

In an embodiment, the signalling payload message identity information element is a SDS signalling payload message identity information element. In an embodiment, the signalling payload message identity information element is a FD signalling payload message identity information element. In an embodiment, the signalling payload message identity information element is an off-network signalling payload message identity information element.

In an embodiment, the disposition type information element is a SDS disposition type information element. In an embodiment, the disposition type information element is a FD disposition type information element.

In an embodiment, the MCData message is generated by composing the MCData message. The MCData message is composed by adding a signalling payload message identity information element to identify the type of the MCData message, adding a date and time information element to indicate a time when the MCData message is sent, adding a conversation identifier information element to uniquely identify a conversation, adding a message identifier information element to uniquely identify the MCData message, adding an In-Reply-to message identifier information element to associate a current MCData message to be sent with an existing MCData message within the conversation, adding an application identifier information element to uniquely identify an application for which the MCData payloads is intended, adding a disposition type information element, and adding a number of payloads information element to identify number of payloads contained in the MCData message.

In an embodiment, the message type information element is a type 3 information element with a length of 1 octet, the disposition type information element is a type 3 information element with a length of 1 octets, the application identifier information element is a type 3 information element with a length of 1 octets, the date and time information element is a type 3 information element with a length of 5 octets, the conversation ID information element is a type 3 information element with a length of 16 octets, the message ID information element is a type 3 information element with a length of 16 octets, the In-Reply-to message ID information element is a type 3 information element with a length of 17 octets, the payload information element is a type 6 information element.

In an embodiment, the MCData message is a SDS signalling payload message. In an embodiment, the MCData message is a FD signalling payload message. In an embodiment, the MCData message is a data payload message.

In an embodiment, the MCData payloads are SDS signalling payloads. In an embodiment, the MCData payloads are FD signalling payloads.

In an embodiment, the UE 200*a* is configured to generate a MCData notification message comprising a signalling content related to multiple MCData payloads. After generating the MCData notification message comprising the signalling content, the UE 200*a* is configured to communicate the MCData notification message to another UEs 200*b*-200*n*.

In an embodiment, the MCData notification message is generated by composing the MCData notification message. The MCData notification message is composed by adding a signalling payload message identity information element to identify the type of the MCData notification message, adding a date and time information element to indicate the time when the MCData notification message is sent, adding a conversation identifier information element to uniquely identify a conversation, adding a message identifier information element to uniquely identify the MCData notification message, adding an In-Reply-to message identifier information element to associate a current MCData notification message to be sent with an existing MCData notification message within the conversation, adding an application identifier information element to uniquely identify an application for which the MCData payloads is intended, adding a disposition type information element, and adding a number of payloads information element to identify number of payloads contained in the MCData notification message.

In an embodiment, the MCData notification message is a SDS notification signalling payload message. In an embodiment, the MCData notification message is a SDS OFF-network notification signalling payload message. In an embodiment, the MCData notification message is a FD notification signalling payload message.

Consider an example, the user of the UE 200*a* shares the location details on a map along with a text message to a rescue team (e.g., fire responder, police or the like) associated with another UEs 200*b*-200*n* for faster reach out to initiate rescue as soon as possible. In this scenario, the location information along with the text message is shared using short message data service over a Session Initiation Protocol (SIP)/Message Session Relay Protocol (MSRP), is encoded in the MCData SDS payload format which can assist the rescue team to reach the destination more accurately.

Consider another example, the user of the UE 200*a* shares the location details in the form of video on the map with the rescue team (e.g., fire responder, police or the like) associated with another UEs 200*b*-200*n* for faster reach out to initiate rescue as soon as possible. In that case, the location details in the form of the video with the text message is shared using a file distribution service over a HTTP, is encoded in the MCData FD payload format which can assist the rescue team to reach the destination more accurately.

Consider an example, if the user of the UE 200*a* wishes to send the text message along with the location Information then, the below is example format of the message information.

```
MESSAGE sip:psi @ example.com SIP/2.0
To: <sip:psi @ example.com>
From: <tel:+8290244755002>;tag=f22e9118
Call-ID: 6NKJGXdYmpAkDHbwTKoJyQ.
CSeq: 1 MESSAGE
Content-Type: multipart/mixed;boundary=mcptt2
Content-Length: 574
--mcptt2
Content-Type: application/vnd.3gpp.mcptt-info+xml
<?xml version ="1.0"?>
```

-continued

```
<mcpttinfo xmlns="urn:3gpp:ns:mcpttInfo:1.0">
<...snip...>
</mcpttinfo>
--mcptt2
Content-Type: sds/sig
17DDDDDf9e2500f42d00f7905ae83a0b487e5af9e2500f4
2d00f53X
--mcptt2--
Content-Type: sds/data
2ILTmessage with call in
backgroundILThttps://XYZcloud.example.com/ftget/667/dis
aster/20151105_112604.jpg
--mcptt2--
```

For the above example, the proposed MCData SDS format utilizes the 206 bytes, so as to improve the resource utilization.

FIG. 2*a* illustrates the MCData SDS Signalling Payload message format including the signalling content related to one or more MCData payloads, the MCData SDS Notification message format and the MCData Data Payload message format, according to an embodiment as disclosed herein.

FIG. 2*b* illustrates the MCData FD Signalling Payload message format including the signalling content related to one or more MCData payloads and the MCData FD Notification message format, according to an embodiment as disclosed herein.

SDS signalling payload message: The SDS signalling payload message is sent by the UE 200*a* to other UEs 200*b*-220*n* when sending an SDS data payload. The SDS signalling payload message provides the signalling content related to a SDS data payload. The signalling content of the message are shown in the Table 1.

TABLE 1

Figure 10:
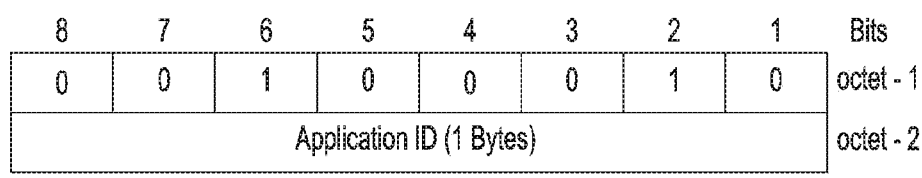
FIG. 10 is an example illustration of an application identifier information element, according to an embodiment as disclosed herein.
Figure 11:
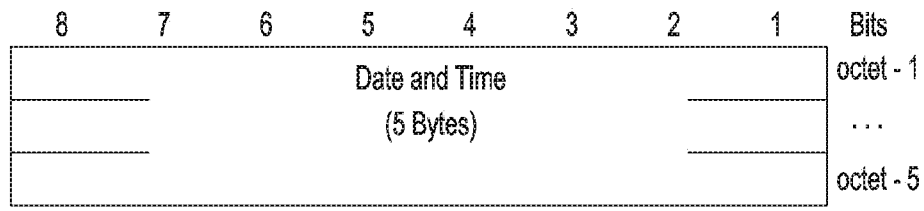
FIG. 11 is an example illustration of a date and time value information element, according to an embodiment as disclosed herein.
Figure 12:
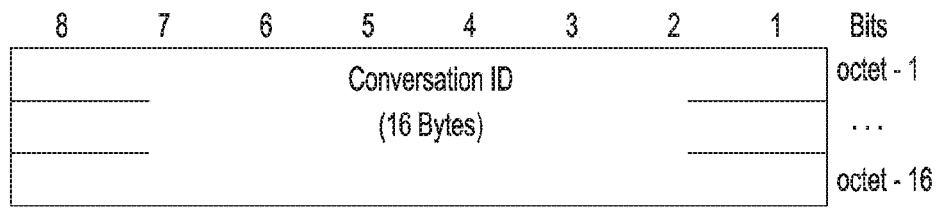
FIG. 12 is an example illustration of a conversation ID information element, according to an embodiment as disclosed herein.
Figure 13:
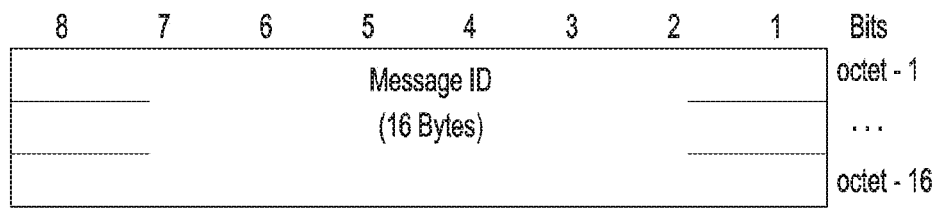
FIG. 13 is an example illustration of a message ID information element, according to an embodiment as disclosed herein.

| IEI | Information Element | Type/Reference | Presence | Format | Length |
|---|---|---|---|---|---|
| | SDS signalling payload message identity | Message type FIG. 5 | M | V | 1 |
| | Date and time | Date and time FIG. 11 | M | V | 5 |
| | Conversation ID | Conversation ID FIG. 12 | M | V | 16 |
| | Message ID | Message ID FIG. 13 | M | V | 16 |
| 21 | InReplyTo message ID | InReplyTo message ID FIG. 15 | O | TV | 17 |
| 22 | Application ID | Application ID FIG. 10 | O | TV | 2 |
| 8- | SDS disposition request type | SDS disposition request type FIG. 6 | O | TV | 1 |

FD signalling payload message: The FD signalling payload message is sent by the UE 200*a* to other UEs 200*n* while sending an FD data payload. The FD signalling payload message provides the signalling content related to the FD data payload. The signalling content of the message is shown in the Table 2.

TABLE 2

| IEI | Information Element | Type/Reference | Presence | Format | Length |
|---|---|---|---|---|---|
| | FD signalling payload message identity | Message type FIG. 5 | M | V | 1 |

TABLE 2-continued

Figure 7:
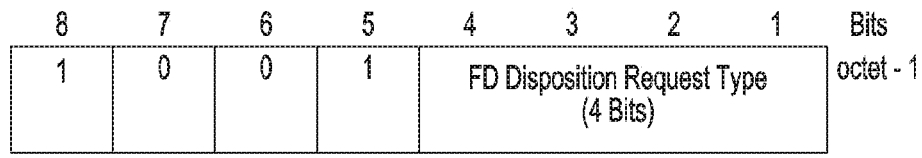
FIG. 7 is an example illustration of a FD disposition request type information element, according to an embodiment as disclosed herein.
Figure 14:
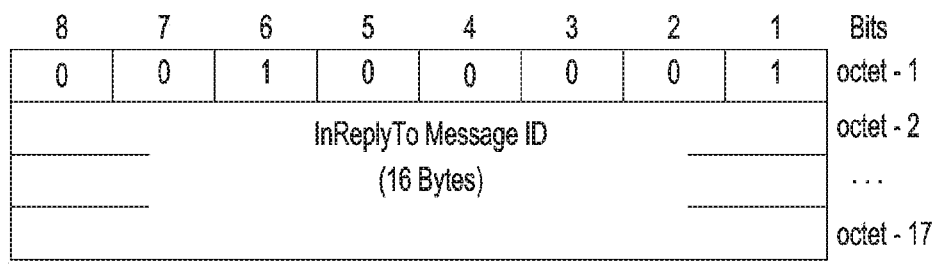
FIG. 14 is an example illustration of a In Reply To message ID information element, according to an embodiment as disclosed herein.

| IEI | Information Element | Type/Reference | Presence | Format | Length |
|---|---|---|---|---|---|
|  | Date and time | Date and time FIG. 11 | M | V | 5 |
|  | Conversation ID | Conversation ID FIG. 12 | M | V | 16 |
|  | Message ID | Message ID FIG. 13 | M | V | 16 |
| 21 | InReplyTo message ID | InReplyTo message ID FIG. 14 | O | TV | 17 |
| 22 | Application ID | Application ID FIG. 10 | O | TV | 2 |
| 9- | FD disposition request type | FD disposition request type FIG. 7 | O | TV | 1 |
| A- | Mandatory download | Mandatory download FIG. 18 | O | TV | 1 |
| 78 | Payload | Payload FIG. 16 | O | TLV-E | 3-x |
| 79 | Metadata | Metadata FIG. 19 | O | TLV-E | 3-x |

Data payload message: The data payload message is sent by the UE 200*a* to other UEs 200*n* while sending the SDS data payload or the FD data payload. The data payload message provides the data to be delivered to the user or application. The signalling contents of the message is shown in the Table 3.

TABLE 3

| IEI | Information Element | Type/Reference | Presence | Format | Length |
|---|---|---|---|---|---|
|  | Data payload message identity | Message type FIG. 5 | M | V | 1 |
|  | Number of payloads | Number of payloads FIG. 15 | M | V | 1 |
| 78 | Payload | Payload FIG. 16 | O | TLV-E | 3-x |

SDS off-network message: The SDS off-network message is illustrated in the Table 4.

TABLE 4

| IEI | Information Element | Type/Reference | Presence | Format | Length |
|---|---|---|---|---|---|
|  | SDS off-network message identity | Message Type FIG. 5 | M | V | 1 |
|  | Date and time | Date and time FIG. 11 | M | V | 5 |
|  | Number of payloads | Number of payloads FIG. 15 | M | V | 1 |
|  | Conversation ID | Conversation ID FIG. 12 | M | V | 16 |
|  | Message ID | Message ID FIG. 13 | M | V | 16 |
|  | Sender MCData user ID | MCData user ID FIG. 20 | M | LV-E | 3-x |
| 21 | InReplyTo message ID | InReplyTo message ID FIG. 14 | O | TV | 17 |
| 22 | Application ID | Application ID FIG. 10 | O | TV | 2 |
| 8- | SDS disposition request type | SDS disposition request type FIG. 6 | O | TV | 1 |

TABLE 4-continued

| IEI | Information Element | Type/Reference | Presence | Format | Length |
|---|---|---|---|---|---|
| 23 | MCData group ID | MCData group ID FIG. 21 | O | TLV-E | 4-x |
| 24 | Recipient MCData user ID | MCData user ID FIG. 20 | O | TLV-E | 4-x |
| 78 | Payload | Payload FIG. 16 | O | TLV-E | 4-x |

SDS notification message: The SDS notification message is sent by the UE 200*a* to another other UE 200*b*-200*n* to share the SDS disposition information. The contents of the message is shown in the Table 5.

TABLE 5

Figure 8:
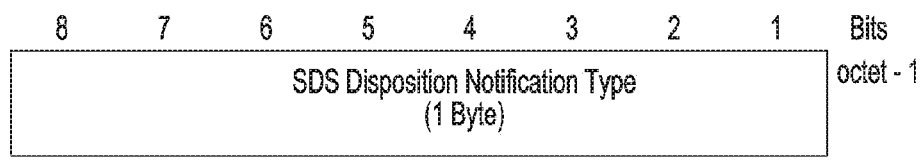
FIG. 8 is an example illustration of a SDS disposition notification type information element, according to an embodiment as disclosed herein.

| IEI | Information Element | Type/Reference | Presence | Format | Length |
|---|---|---|---|---|---|
|  | SDS notification message identity | Message type FIG. 5 | M | V | 1 |
|  | SDS disposition notification type | SDS disposition notification type FIG. 8 | M | V | 1 |
|  | Date and time | Date and time FIG. 11 | M | V | 5 |
|  | Conversation ID | Conversation ID FIG. 12 | M | V | 16 |
|  | Message ID | Message ID FIG. 13 | M | V | 16 |
| 22 | Application ID | Application ID FIG. 10 | O | TV | 2 |

FD notification message: The FD notification message is sent by the UE 200*a* to another UE 200*b*-200*n* to share the FD disposition information. The contents of the message see Table 6.

TABLE 6

Figure 9:
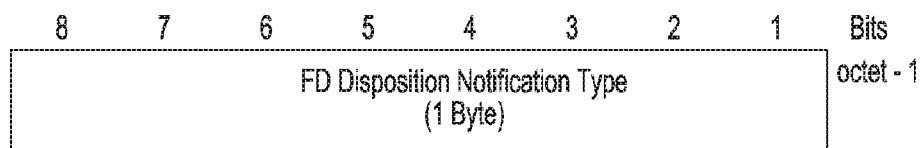
FIG. 9 is an example illustration of a FD disposition notification type information element, according to an embodiment as disclosed herein.

| IEI | Information Element | Type/Reference | Presence | Format | Length |
|---|---|---|---|---|---|
|  | FD notification message identity | Message type FIG. 5 | M | V | 1 |
|  | FD disposition notification type | FD disposition notification type FIG. 9 | M | V | 1 |
|  | Date and time | Date and time FIG. 11 | M | V | 5 |
|  | Conversation ID | Conversation ID FIG. 12 | M | V | 16 |
|  | Message ID | Message ID FIG. 13 | M | V | 16 |
| 22 | Application ID | Application ID FIG. 10 | O | TV | 2 |

SDS off-network notification message: The SDS off-network notification message is shown in the table 7.

TABLE 7

| IEI | Information Element | Type/Reference | Presence | Format | Length |
|---|---|---|---|---|---|
|  | SDS off-network notification message identity | Message type FIG. 5 | M | V | 1 |
|  | SDS disposition notification type | SDS disposition notification type FIG. 8 | M | V | 1 |

TABLE 7-continued

| IEI | Information Element | Type/Reference | Presence | Format | Length |
|---|---|---|---|---|---|
| | Date and time | Date and time FIG. 11 | M | V | 5 |
| | Conversation ID | Conversation ID FIG. 12 | M | V | 16 |
| | Message ID | Message ID FIG. 13 | M | V | 16 |
| | Sender MCData user ID | MCData user ID FIG. 20 | M | LV-E | 3-x |
| 22 | Application ID | Application ID FIG. 10 | O | TV | 2 |

FIG. 3 is an example illustration of bit ordering of a field related to the MCData message, according to an embodiment as disclosed herein.

The least significant bit of the field is represented by the lowest numbered bit of the highest numbered octet of the field. When the field extends over more than one octet, the order of bit values progressively decreases as the octet number increases.

The FIG. 3 shows an example of the field where the most significant bit of the field is marked MSB and the least significant bit of the field is marked LSB.

The organization of the MCData message is illustrated in the FIG. 3. Unless specified otherwise in the message description, a particular information element shall not be present more than once in a provided message.

In an example, a sending entity (e.g., sending UE 200*a*) shall set value of a spare bit to zero. A receiving entity (e.g., receiving UE 200*b*) shall ignore value of a spare bit. The sending entity shall not set a value of an information element to a reserved value. The receiving entity shall discard message containing an information element set to a reserved value.

FIG. 4 is an example illustration of a general MCData message organization, according to an embodiment as disclosed herein.

Within the protocols defined in the present disclosure, the message consists of the following parts:
a) Message type information element; and
b) other information elements, as required.

FIG. 5 is an example illustration of message type information element, according to an embodiment as disclosed herein.

Message type: The purpose of the message type information element is to identify the type of the MCData message. The value part of the message type information element is coded as shown in Table 8. The message type information element is a type 3 information element with a length of 1 octet.

TABLE 8

| Bits | | | | | | | | |
|---|---|---|---|---|---|---|---|---|
| 8 | 7 | 6 | 5 | 4 | 3 | 2 | 1 | |
| 0 | 0 | 0 | 0 | 0 | 0 | 0 | 1 | SDS SIGNALLING PAYLOAD |
| 0 | 0 | 0 | 0 | 0 | 0 | 1 | 0 | FD SIGNALLING PAYLOAD |
| 0 | 0 | 0 | 0 | 0 | 0 | 1 | 1 | DATA PAYLOAD |
| 0 | 0 | 0 | 0 | 0 | 1 | 0 | 1 | SDS NOTIFICATION |
| 0 | 0 | 0 | 0 | 0 | 1 | 1 | 0 | FD NOTIFICATION |
| 0 | 0 | 0 | 0 | 0 | 1 | 1 | 1 | SDS OFF-NETWORK MESSAGE |
| 0 | 0 | 0 | 0 | 1 | 0 | 0 | 0 | SDS OFF-NETWORK NOTIFICATION |

All other values are reserved.

FIG. 6 is an example illustration of SDS disposition request type information element, according to an embodiment as disclosed herein.

SDS disposition request type: The purpose of the SDS disposition request type information element is to identify the type of the SDS disposition notification that the sender requires from the receiver. The value part of the SDS disposition request type information element is coded as shown in Table 9. The SDS disposition request type information element is a type 1 information element.

TABLE 9

| Bits | | | | |
|---|---|---|---|---|
| 4 | 3 | 2 | 1 | |
| 0 | 0 | 0 | 1 | Delivery |
| 0 | 0 | 1 | 0 | Read |
| 0 | 0 | 1 | 1 | Delivery and Read |

All other values are reserved

FIG. 7 is an example illustration of FD disposition request type information element, according to an embodiment as disclosed herein.

FD disposition request type: The purpose of the FD disposition request type information element is to identify the type of the FD disposition notification that the sender requires from the receiver. The value part of the FD disposition request type information element is coded as shown in Table 10. The FD disposition request type information element is a type 1 information element.

TABLE 10

| Bits | | | | |
|---|---|---|---|---|
| 4 | 3 | 2 | 1 | |
| 0 | 0 | 0 | 1 | File Download Completed Update |

All other values are reserved

FIG. 8 is an example illustration of SDS disposition notification type information element, according to an embodiment as disclosed herein.

SDS disposition notification type: The purpose of the SDS disposition notification type information element is to identify the type of the SDS disposition notification that the request receiver is notifying back to the sender. The value part of the SDS disposition notification type information element is coded as shown in Table 11. The SDS disposition notification type information element is a type 3 information element with a length of 1 octet.

TABLE 11

| Bits | | | | | | | | |
|---|---|---|---|---|---|---|---|---|
| 8 | 7 | 6 | 5 | 4 | 3 | 2 | 1 | |
| 0 | 0 | 0 | 0 | 0 | 0 | 0 | 1 | Undelivered |
| 0 | 0 | 0 | 0 | 0 | 0 | 1 | 0 | Delivered |
| 0 | 0 | 0 | 0 | 0 | 0 | 1 | 1 | Read |
| 0 | 0 | 0 | 0 | 0 | 1 | 0 | 0 | Delivered and Read |

All other values are reserved.

FIG. 9 is an example illustration of FD disposition notification type information element, according to an embodiment as disclosed herein.

FD disposition notification type: The purpose of the FD disposition notification type information element is to identify the type of the FD disposition notification that the request receiver is notifying back to the sender. The value part of the FD disposition notification type information element is coded as shown in Table 12. The FD disposition notification type information element is a type 3 information element with a length of 1 octet.

TABLE 12

| | | | Bits | | | | | |
|---|---|---|---|---|---|---|---|---|
| 8 | 7 | 6 | 5 | 4 | 3 | 2 | 1 | |
| 0 | 0 | 0 | 0 | 0 | 0 | 0 | 1 | File Download Request Accepted |
| 0 | 0 | 0 | 0 | 0 | 0 | 1 | 0 | File Download Request Rejected |
| 0 | 0 | 0 | 0 | 0 | 0 | 1 | 1 | File Download Completed |
| 0 | 0 | 0 | 0 | 0 | 1 | 0 | 0 | File Download Deferred |

All other values are reserved.

FIG. 10 is an example illustration of the application identifier information element, according to an embodiment as disclosed herein.

Application identifier information element: The purpose of the application identifier information element is to uniquely identify the application for which the payload is intended. The application identifier information element is coded as shown in Table 13. The application identifier information element is a type 3 information element with a length of 2 octets.

TABLE 13

| Application, identifier value (octet 1) |
|---|
| The Application identifier contains a number uniquely identifying the destination application. |

In an embodiment, it is also possible to use another type of application identifier (e.g., IMS Application Reference Identifier (IARI)) instead of value defined here. Using another type of application identifier may increase length of the application Identifier IE.

FIG. 11 is an example illustration of a date and time value information element, according to an embodiment as disclosed herein.

Date and time information element: The date and time information element is used to indicate a Coordinated Universal Time (i.e., UTC time) when the MCData message was sent. The date and time information element is coded as shown in Table 14. The date and time information element is a type 3 information element with a length of 5 octets.

TABLE 14

| Date and time value (octet 1 to 5) |
|---|
| The Date and time value is an unsigned integer containing UTC time of the time when a message was sent, in seconds since midnight UTC of January 1, 1970 (not counting leap seconds). |

FIG. 12 is an example illustration of the conversation ID information element, according to an embodiment as disclosed herein.

Conversation ID information element: The purpose of the conversation ID information element is to uniquely identify the conversation. The conversation ID information element is coded as shown in Table 15. The conversation ID information element is a type 3 information element with a length of 16 octets.

TABLE 15

| ConversationIDvalue (octet 1 to 16) |
|---|
| The ConversationID contains a number uniquely identifying the conversation.<br>The value SHALL be a universally unique identifier, as specified in [RFC4122].<br>Following the conventions in [RFC4122], Conversation ID is case-insensitive. |

FIG. 13 is an example illustration of the message ID information element, according to an embodiment as disclosed herein.

Message ID information element: The purpose of the message ID information element is to uniquely identify the MCData message. The message ID information element is coded as shown in the Table 16. The message ID information element is a type 3 information element with a length of 16 octets. The message ID information element uniquely identifies the MCData message within the conversation.

TABLE 16

| Message ID value (octet 1 to 16) |
|---|
| The Message ID contains a number uniquely identifying a message. The value SHALL be a universally unique identifier, as specified in [RFC4122]. Following the conventions in [RFC4122], Message ID is case-insensitive. |

FIG. 14 is an example illustration of the InReplyTo Message ID information element, according to an embodiment as disclosed herein.

InReplyTo Message ID information element: The purpose of the InReplyTo Message ID information element is used to associate current MCData message to be sent with an existing MCData message within the conversation.

In an embodiment, the InReplyTo message ID information element is used to associate the MCData message within the conversation to which the MCData message is a reply in the conversation. The InReplyTo Message ID information element is coded as shown in Table 17. The InReplyTo Message ID information element is a type 3 information element with a length of 17 octets.

TABLE 17

| InReplyTo message ID value (octet 2 to 17) |
|---|
| The InReplyTo message ID contains a number uniquely identifying a message.<br>The value is a universally unique identifier as specified in IETF RFC 4122 [14]. |

FIG. 15 is an example illustration of the number of payloads information element, according to an embodiment as disclosed herein.

Number of payloads information element: indicates the number of payloads the MCData message contains. In an embodiment, the number of payloads information element is a type 3 information element with a length of 1 octet. The number of payloads information element is coded as shown in Table 18.

TABLE 18

Number of payloads value (octet 1)

The Number of payloads contains a value from 1 to 255.

FIG. 16 is an example illustration of the payload information element, according to an embodiment as disclosed herein. The purpose of the payload information element is to contain application payload. The payload information element is a type 6 information element. The payload contents field of the payload information element is coded as described in FIG. 17. In an embodiment, the MCData Payload message can contain multiple Payload IEs.

FIG. 17 is an example illustration of the number of payload contents field of the payload information element as illustrated in FIG. 16, according to an embodiment as disclosed herein.

Payload content type: The first octet of payload contents field indicates the type of the payload data. The payload content type octet is coded as shown in Table 19.

TABLE 19

| Bits | | | | | | | | |
|---|---|---|---|---|---|---|---|---|
| 8 | 7 | 6 | 5 | 4 | 3 | 2 | 1 | |
| 0 | 0 | 0 | 0 | 0 | 0 | 0 | 1 | Text |
| 0 | 0 | 0 | 0 | 0 | 0 | 1 | 0 | Binary |
| 0 | 0 | 0 | 0 | 0 | 0 | 1 | 1 | Hyperlinks |
| 0 | 0 | 0 | 0 | 0 | 1 | 0 | 0 | File URL |
| 0 | 0 | 0 | 0 | 0 | 1 | 0 | 1 | Location |

All other values are reserved.

Payload data: Remaining octets of the payload contents field contains the payload data. The payload data is coded as shown in Table 20.

TABLE 20

Payload data is included in octet 5 to octet n; Max value of 65535 octets.
Payload data contains the payload destined for the user or application.
A file URL is encoded as specified in IETF RFC 1738 [rfc1738].
The length of location information payload content is 6 bytes. First 3 bytes contain the latitude information and next 3 bytes contain the longitude information.

FIG. 18 is an example illustration of the mandatory download information element, according to an embodiment as disclosed herein.

Mandatory download: The purpose of the mandatory download information element is to indicate that it is mandatory to download the file indicated in the request. The mandatory download information element is a type 1 information element. The mandatory download information element is coded as shown in Table 21.

TABLE 21

| Bits | | | | |
|---|---|---|---|---|
| 4 | 3 | 2 | 1 | |
| 0 | 0 | 0 | 1 | Mandatory Download |

All other values are reserved.

FIG. 18 is an example illustration of the mandatory download information element, according to an embodiment as disclosed herein.

Mandatory download: The purpose of the mandatory download information element is to indicate that it is mandatory to download the file indicated in the request. The mandatory download information element is a type 1 information element. The mandatory download information element is coded as shown in Table 22.

TABLE 22

| Bits | | | | |
|---|---|---|---|---|
| 4 | 3 | 2 | 1 | |
| 0 | 0 | 0 | 1 | Mandatory Download |

All other values are reserved.

FIG. 19 is an example illustration of the metadata information element, according to an embodiment as disclosed herein.

Metadata: The purpose of the metadata information element is to provide details of the file indicated in the request. The metadata information element is a type 6 information element. The metadata information element is coded as shown in Table 23.

TABLE 23

Metadata is contained in octet 4 to octet n; Max value of 65535 octets.
Metadata contains a concatenation of the following data:
    - fileselector (which is a concatenation of filename, filesize, filetype and hash)
    - file-date (which is set to creation", "modification" or "read" with a date/time, to indicate date/time file was created, last modified or last read)
    - file-availability (set to a date and time that the file is available until)
The file-selector is encoded as shown in the "file-selector-attr" ABNF specified in IETF RFC 5547 [x].
The file-date is encoded as shown in the "file-date-attr" ABNF specified in IETF RFC 5547 [x].
The file-availability is encoded as
file-availability = "file-availability:" date-time;
dale-time is defined in IETF RFC 5322 [34]

FIG. 20 is an example illustration of the MCData user ID information element, according to an embodiment as disclosed herein.

MCData user ID: The purpose of the MCData user ID information element is to contain the MCData user ID. The MCData user ID information element is a type 6 information element. The MCData user ID information element is coded as shown in Table 24.

TABLE 24

MCData user ID is contained in octet 4 to octet n if the IE is used as an optional IE.
If used as a mandatory IE, MCData user ID IEI is omitted and MCData user ID is contained in octet 3 to octet n;
Max value of 65535 octets.

FIG. 21 is an example illustration of the MCData group ID information element, according to an embodiment as disclosed herein.

MCData group ID: The purpose of the MCData group ID information element is to contain the MCData group ID. The MCData group ID information element is a type 6 information element. The MCData group ID information element is coded as shown in Table 25.

TABLE 25

MCData group ID is contained in octet 4 to octet n; Max value of 65535 octets.

Figure 22:
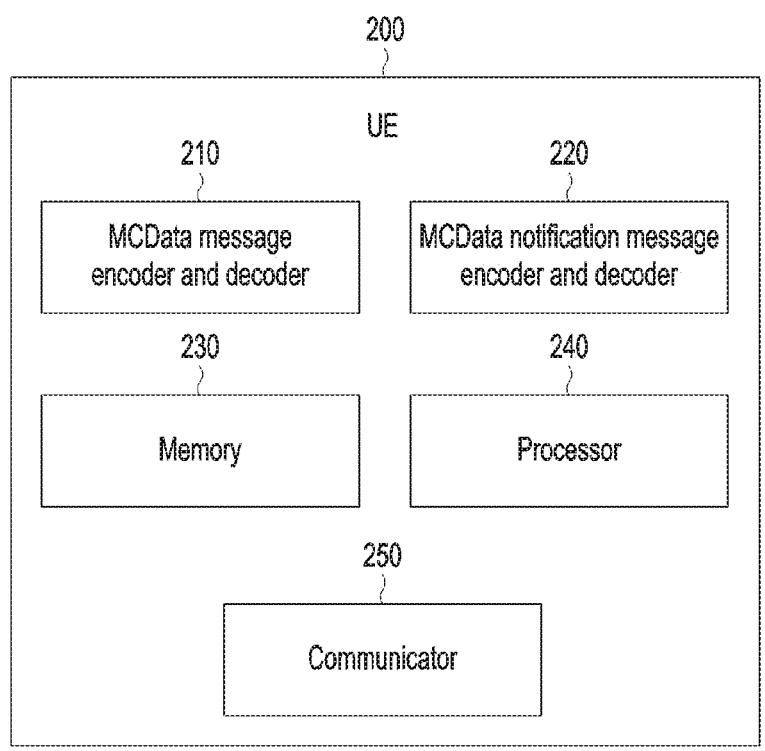
FIG. 22 is a block diagram of a UE, according to an embodiment as disclosed herein.

FIG. 22 is a block diagram of the UE 200*a*-220*n* (Hereafter, the label of the UE is 200), according to an embodiment as disclosed herein. In an embodiment, the UE includes a MCData message encoder and decoder 210, a MCData notification message encoder and decoder 220, a memory 230, a processor 240 and a communicator 250.

The MCData message encoder and decoder 210 is operably coupled to the MCData notification message encoder and decoder 220, the memory 230 and the processor 240. The MCData message encoder and decoder 210 is configured to generate the MCData message including the signalling content related to multiple MCData payloads. After generating the MCData message including the signalling content related to multiple MCData payloads, the communicator 250 is configured to communicate the MCData message to another UE 200*b*-200*n*.

In an embodiment, the MCData notification message encoder and decoder 220 is operably coupled to the memory 230 and the processor 240. The MCData notification message encoder and decoder 220 is configured to generate the MCData notification message including the signalling content related to multiple MCData payloads. After generating the MCData notification message including the signalling content related to multiple MCData payloads, the communicator 250 is configured to communicate the MCData notification message to another UE 200*b*-220*n*.

The communicator 250 is configured for communicating internally between internal hardware components and with external devices via one or more networks (not shown). The communicator 250 is configured for communicating with the MCData notification message encoder and decoder 220 and the MCData message encoder and decoder 210 to encode and decode the MCData messages in the MCData communication system 100.

The memory 230 stores the signalling content related to multiple MCData payloads. The memory 230 also stores instruction to manage the MCData service in the MCData communication system 100. The memory 230 also stores instructions to be executed by the processor 240. The memory 230 may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory 230 may, in some examples, be considered a non-transitory storage medium. The term "non-transitory" may indicate that the storage medium is not embodied in a carrier wave or a propagated signal. However, the term "non-transitory" should not be interpreted that the memory 230 is non-movable. In some examples, the memory 230 can be configured to store larger amounts of information than the memory. In certain examples, a non-transitory storage medium may store data that can, over time, change (e.g., in Random Access Memory (RAM) or cache).

Although the FIG. 22 shows the hardware components of the UE 200 but it is to be understood that other embodiments are not limited thereon. In other embodiments, the UE 200 may include less or more number of hardware components. Further, the labels or names of the hardware components are used only for illustrative purpose and does not limit the scope of the present disclosure. One or more components can be combined together to perform same or substantially similar function to encode and decode the MCData messages in the MCData communication system 100.

Figure 23:
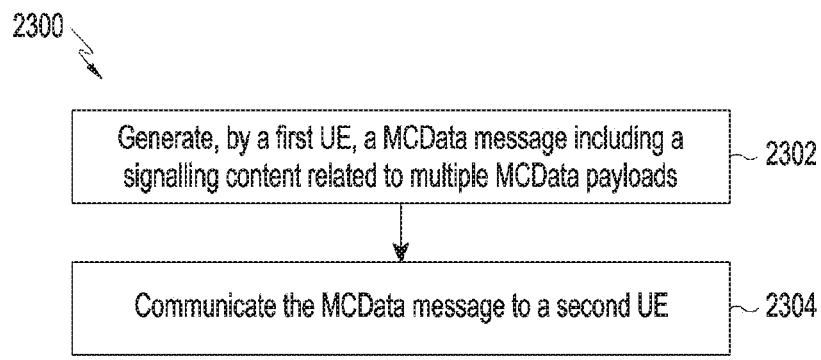
FIG. 23 is a flow diagram illustrating various operations for encoding and decoding MCData messages in the MCData communication system, according to an embodiment as disclosed herein.

FIG. 23 is a flow diagram 2300 illustrating various operations for encoding and decoding MCData messages in the MCData communication system 100, according to an embodiment as disclosed herein. The operations (2302 and 2304) are performed by the MCData message encoder and decoder 210. At 2302, the method includes generating the MCData message including the signalling content related to multiple MCData payloads. At 2304, the method includes communicating the MCData message to another UE 200*b*-220*n*.

The various actions, acts, blocks, steps, or the like in the flow diagram 2300 may be performed in the order presented, in a different order or simultaneously. Further, in some embodiments, some of the actions, acts, blocks, steps, or the like may be omitted, added, modified, skipped, or the like without departing from the scope of the present disclosure.

Figure 24:
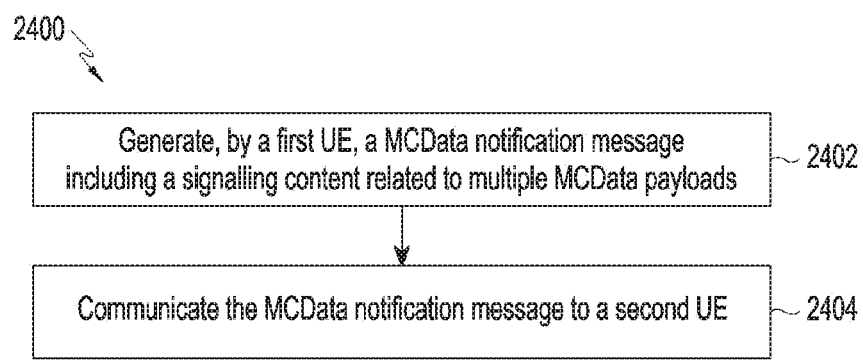
FIG. 24 is a flow diagram illustrating various operations for encoding and decoding MCData notification messages in the MCData communication system, according to an embodiment as disclosed herein.

FIG. 24 is a flow diagram 2400 illustrating various operations for encoding and decoding the MCData notification messages in the MCData communication system 100, according to an embodiment as disclosed herein. The operations (2402 and 2404) are performed by the MCData notification message encoder and decoder 220. At 2402, the method includes generating the MCData notification message including the signalling content related to multiple MCData payloads. At 2404, the method includes communicating the MCData notification message to another UEs 200*b*-200*n*.

The various actions, acts, blocks, steps, or the like in the flow diagram 2400 may be performed in the order presented, in a different order or simultaneously. Further, in some embodiments, some of the actions, acts, blocks, steps, or the like may be omitted, added, modified, skipped, or the like without departing from the scope of the present disclosure.

Figure 25:
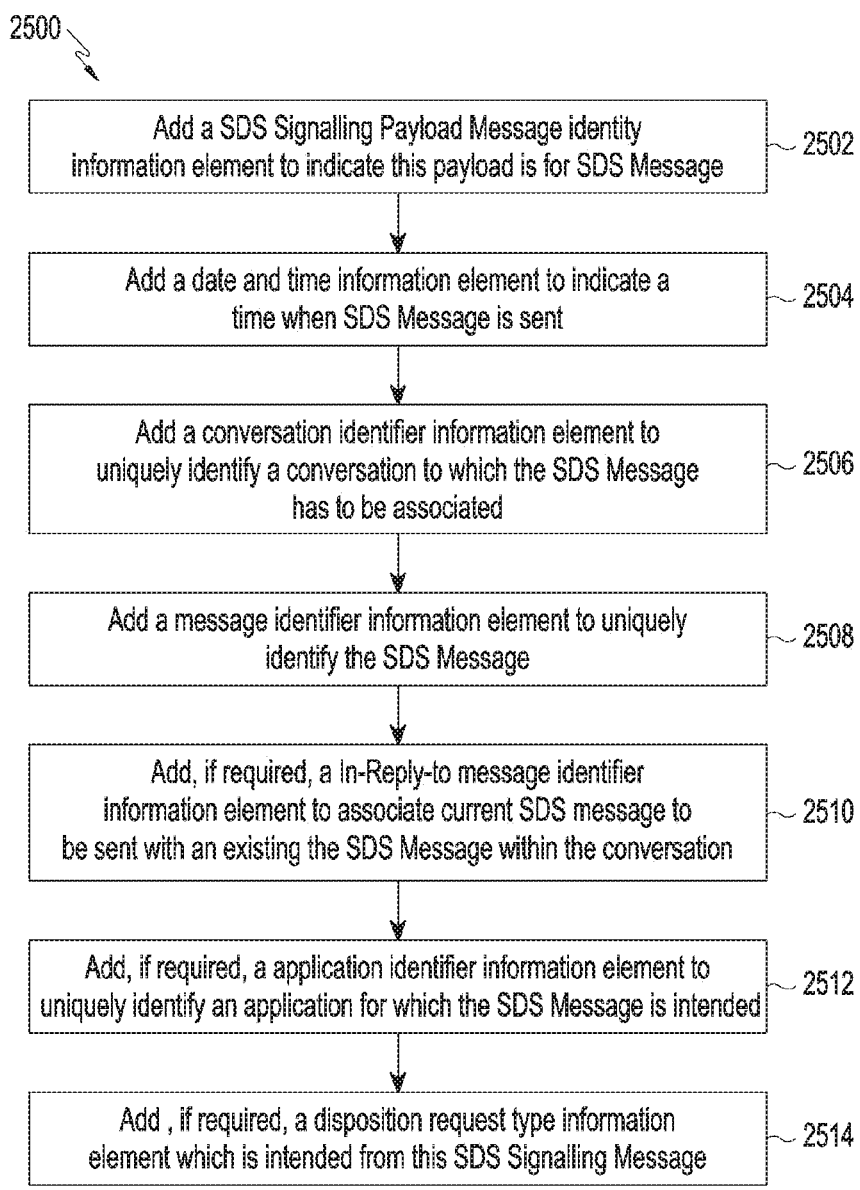
FIG. 25 is a flow diagram illustrating various operations for generating the MCData SDS signalling Payload message while encoding and decoding the MCData messages in the MCData communication system, according to an embodiment as disclosed herein.

FIG. 25 is a flow diagram 2500 illustrating various operations for generating the MCData SDS Signalling payload message while encoding and decoding the MCData SDS messages in the MCData communication system 100, according to an embodiment as disclosed herein. The operations (2502-25084) are performed by MCData message encoder and decoder 210.

At 2502, the method includes adding the signalling payload message identity information element to identify the type of the message. At 2504, the method includes adding the date and time information element to indicate the time when the message is sent. At 2506, the method includes adding the conversation identifier information element to uniquely identify the conversation to which the message has to be associated. At 2508, the method includes adding the message identifier information element to uniquely identify the MCData message. At 2510, the method includes adding the In-Reply-to message identifier information element to associate current message to be sent with an existing message within the conversation. At 2512, the method includes adding the application identifier information element to uniquely identify the application for which the MCData payloads is intended. At 2514, the method includes adding the disposition request type information element which is expects the disposition from the MCData message receiver.

The various actions, acts, blocks, steps, or the like in the flow diagram 2500 may be performed in the order presented, in a different order or simultaneously. Further, in some embodiments, some of the actions, acts, blocks, steps, or the like may be omitted, added, modified, skipped, or the like without departing from the scope of the present disclosure.

Figure 26:
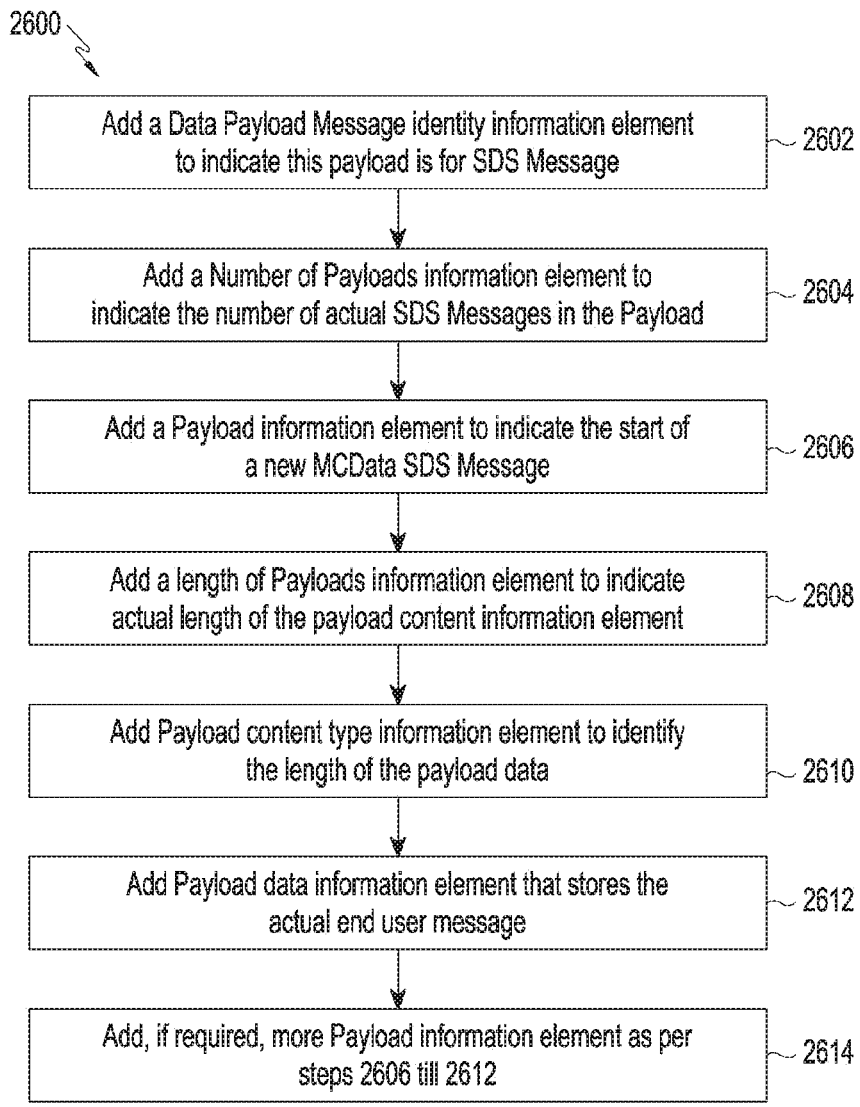
FIG. 26 is a flow diagram illustrating various operations for generating the MCData SDS Disposition Notification message while encoding and decoding the MCData notification messages in the MCData communication system, according to an embodiment as disclosed herein.

FIG. 26 is a flow diagram 2600 illustrating various operations for generating the MCData SDS Data payload message while encoding and decoding the MCData SDS messages in the MCData communication system 100, according to an embodiment as disclosed herein. The operations (2602-2614) are performed by MCData message encoder and decoder 210.

At 2602, the method includes adding the data payload message identity information element to indicate the payload is for MCData SDS Message. At 2604, the method includes adding the number of payloads information element which indicates the total payloads in this data payload message. At 2606, the method includes adding the payload information element to indicate the start of a new MCData SDS Message. At 2608, the method includes adding the length of payload information element to indicate the actual length of the payload content information element. At 2610, the method includes adding the payload content type information element to identify the length of the payload data. At 2612, the method includes adding the payload data information element that stores the actual end user message. At 2614, the method explains adding more payload information in case of multiple messages from the user.

The various actions, acts, blocks, steps, or the like in the flow diagram 2600 may be performed in the order presented, in a different order or simultaneously. Further, in some embodiments, some of the actions, acts, blocks, steps, or the like may be omitted, added, modified, skipped, or the like without departing from the scope of the present disclosure.

Figure 27:
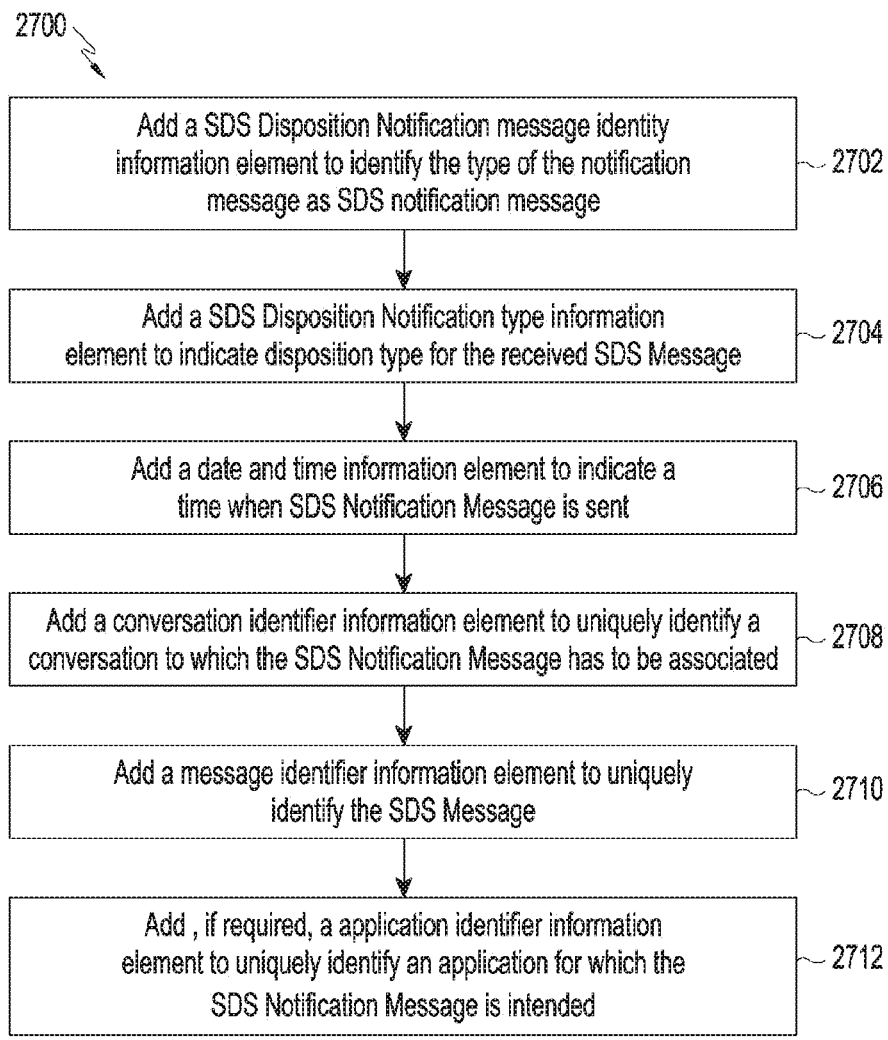
FIG. 27 is a flow diagram illustrating various operations for generating the MCData FD Signalling Payload message while encoding and decoding the MCData messages in the MCData communication system, according to an embodiment as disclosed herein.

FIG. 27 is a flow diagram 2700 illustrating various operations for generating the MCData SDS notification message while encoding and decoding the MCData SDS notification messages in the MCData communication system 100, according to an embodiment as disclosed herein. The operations (2702-2712) are performed by MCData notification message encoder and decoder 220.

At 2702, the method includes adding the SDS disposition notification message identity information element to identify the type of the notification message as SDS notification message. At 2704 the method includes adding the SDS disposition notification type information element to indicate the disposition type for the received SDS Message. At 2706, the method includes adding the date and time information element to indicate the time when the SDS notification message is sent. At 2708, the method includes adding the conversation identifier information element to uniquely identify the conversation to which the SDS notification message has to be associated. At 2710, the method includes adding the message identifier information element to uniquely identify the MCData SDS message to which this disposition notification is issues. At 2712, the method includes adding an application identifier information element to uniquely identify an application for which the SDS notification message is intended.

The various actions, acts, blocks, steps, or the like in the flow diagram 2700 may be performed in the order presented, in a different order or simultaneously. Further, in some embodiments, some of the actions, acts, blocks, steps, or the like may be omitted, added, modified, skipped, or the like without departing from the scope of the present disclosure.

Figure 28:
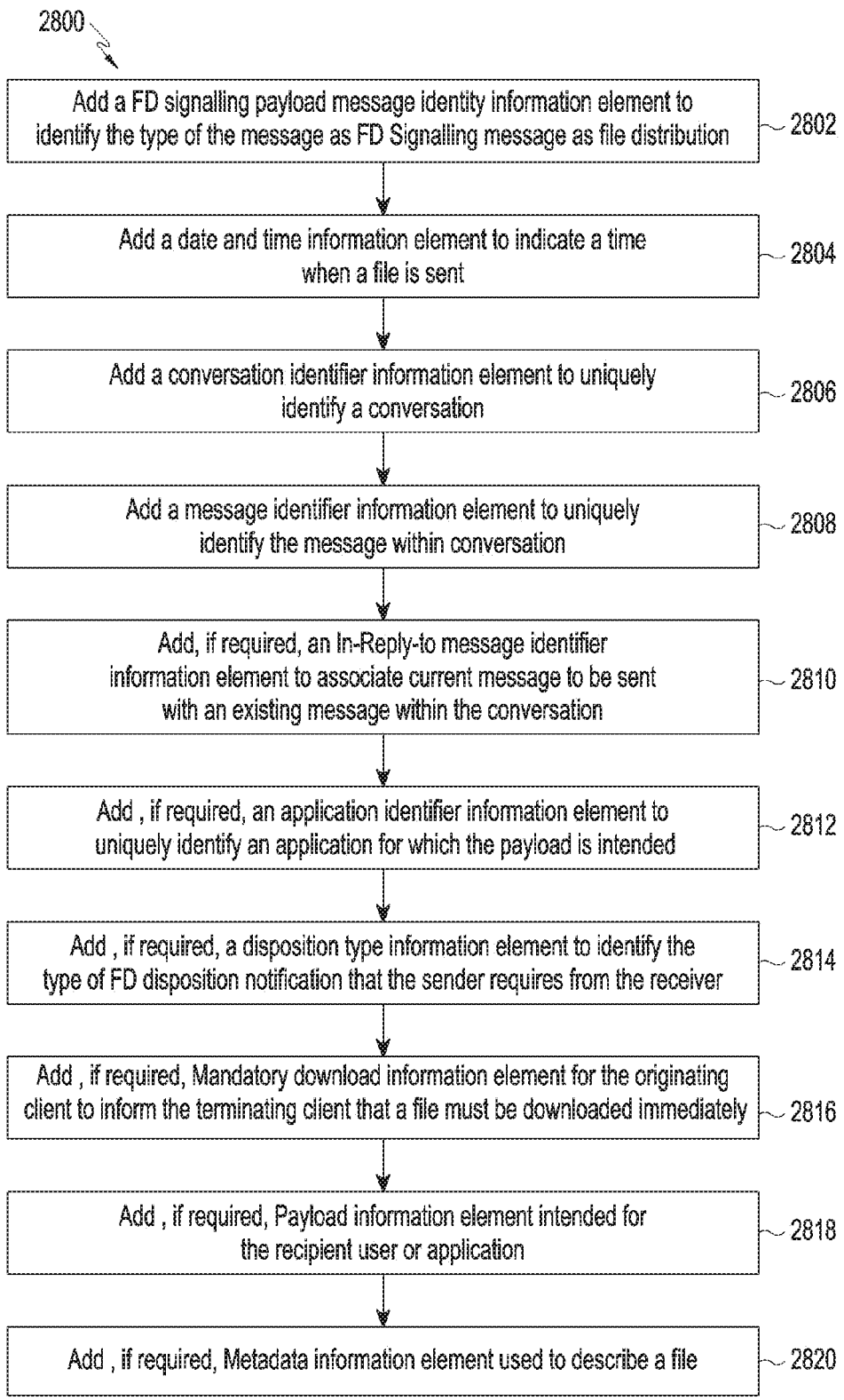
FIG. 28 is a flow diagram illustrating various operations for generating the MCData FD Disposition Notification message while encoding and decoding the MCData notification messages in the MCData communication system, according to an embodiment as disclosed herein.

FIG. 28 is a flow diagram 2800 illustrating various operations for generating the MCData message while managing the MCData notification messages in the MCData communication system 100, according to an embodiment as disclosed herein. The operations (2802-2820) are performed by MCData message encoder and decoder 210.

At 2802, the method includes adding the FD signalling payload message identity information element to identify the type of the message as file distribution. At 2804, the method includes adding the date and time information element to indicate the time when the file is sent. At 2806, the method includes adding the conversation identifier information element to uniquely identify the conversation. At 2808, the method includes adding the message identifier information element to uniquely identify the MCData message. At 2810, the method includes adding the In-Reply-to message identifier information element to associate current message to be sent with an existing message within the conversation. At 2812, the method includes adding the application identifier information element to uniquely identify the application for which the payload is intended. At 2814, the method includes adding the disposition type information element to identify the types of FD disposition notification that the sender requires from the receiver. At 2816, the method includes adding mandatory download information element for the originating client to inform the terminating client that a file must be downloaded immediately. At 2818, the method includes adding payload information element intended for the recipient user or application. At 2820, the method includes adding the metadata information element used to describe a file.

The various actions, acts, blocks, steps, or the like in the flow diagram 2800 may be performed in the order presented, in a different order or simultaneously. Further, in some embodiments, some of the actions, acts, blocks, steps, or the like may be omitted, added, modified, skipped, or the like without departing from the scope of the present disclosure.

Figure 29:
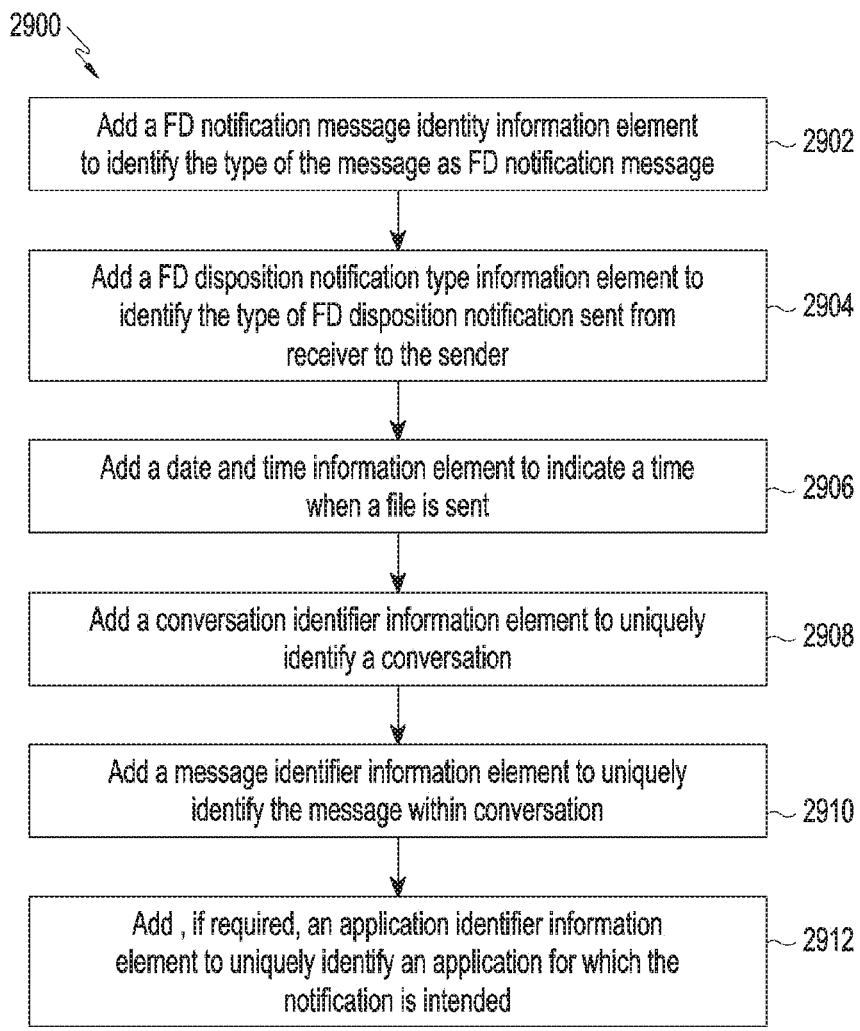
FIG. 29 is a flow diagram illustrating various operations for generating the MCData notification message while managing the MCData notification messages in the MCData communication system, according to an embodiment as disclosed herein.

FIG. 29 is a flow diagram 2900 illustrating various operations for generating the MCData notification message while managing the MCData notification messages in the MCData communication system 100, according to an embodiment as disclosed herein. The operations (2902-2912) are performed by MCData notification message encoder and decoder 220.

At 2902, the method includes adding the FD notification message identity information element to identify the type of the message as file distribution notification. At 2904, the method includes adding the FD disposition notification type information element to identify the type of FD disposition notification sent from receiver to the sender. At 2906, the method includes adding the date and time information element to indicate the time when the message is sent. At 2908, the method includes adding the conversation identifier information element to uniquely identify the conversation. At 2910, the method includes adding the message identifier information element to uniquely identify the notification message within conversation. At 2912, the method includes adding an application identifier information element to uniquely identify an application for which the MCData notification is intended.

The various actions, acts, blocks, steps, or the like in the flow diagram 2900 may be performed in the order presented, in a different order or simultaneously. Further, in some embodiments, some of the actions, acts, blocks, steps, or the like may be omitted, added, modified, skipped, or the like without departing from the scope of the present disclosure.

The embodiments herein are not only limited to the formats of MCData systems and can be used by commercial applications also.

The embodiments disclosed herein can be implemented using at least one software program running on at least one hardware device and performing network management functions to control the elements.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

What is claimed:

1. A method for transmitting a mission critical data (MCData) notification message by a first user equipment (UE) in a communication system, comprising:
   generating an MCData notification message to share disposition information; and
   transmitting the MCData notification message to a second UE,
   wherein the MCData notification message comprises notification message identity information to identify a type of the MCData notification message, disposition notification type information to identify a type of a disposition notification, date and time information, conversation identifier (ID) information to identify a conversation, and message ID information to identify the MCData notification message within the conversation,
   wherein the notification message type information is information with a length of 1 octet the disposition notification type information is information with a length of 1 octet, the date and time information is information with a length of 5 octets, the conversation ID information is information with a length of 16 octets, and the message ID information is information with a length of 16 octets, and
   wherein each of the notification message type information, and disposition notification type information, the date and time information, the conversation ID information, and the message ID information has a format including a value part without a type part and a length part.

2. The method of claim 1, wherein the MCData notification message further comprises
   application ID information to identify an application for which the MCData notification message is intended.

3. The method of claim 2, wherein the application ID information is information with a length of 2 octets, and the application ID information has a format including the type part and the value part without the length part.

4. The method of claim 1, wherein the MCData notification message is one of a short data service (SDS) notification message, an SDS off-network notification message, and a file distribution (FD) notification message.

5. A first user equipment (UE) in a communication system, comprising:
   a transceiver; and
   at least one processor configured to:
   generate a mission critical data (MCData) notification message to share disposition information, and
   control the transceiver to transmit the MCData notification message to a second UE,
   wherein the MCData notification message comprises notification message identity information to identify a type of the MCData notification message, disposition notification type information to identify a type of a disposition notification, date and time information, conversation identifier (ID) information to identify a conversation, and message ID information to identify the MCData notification message within the conversation,
   wherein the notification message type information is information with a length of 1 octet, the disposition notification type information is information with a length of 1 octet, the date and time information is information with a length of 5 octets, the conversation ID information is information with a length of 16 octets, and the message ID information is information with a length of 16 octet, and
   wherein each of the notification message type information, the disposition notification type information, the date and time information, the conversation ID information, and the message ID information has a format including a value part without a type part and a length part.

6. The first UE of claim 5, wherein the MCData notification message further comprises application ID information to identify an application for which the MCData notification message is intended.

7. The first UE of claim 6, wherein the application ID information is information with a length of 2 octets, and the application ID information has a format including the type part and the value part without the length part.

8. The first UE of claim 5, wherein the MCData notification message is one of a short data service (SDS) notification message, an SDS off-network notification message, and a file distribution (FD) notification message.

* * * * *